United States Patent
Boe (10) Patent No.: US 6,823,588 B2
(45) Date of Patent: Nov. 30, 2004

(54) METHODS FOR PREVENTING DISENGAGEMENT OF ELECTRICAL CONNECTORS IN THE ASSEMBLY OF COMPUTERS

(75) Inventor: Craig L. Boe, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 126 days.

(21) Appl. No.: 10/155,674

(22) Filed: May 23, 2002

(65) Prior Publication Data

US 2002/0151226 A1 Oct. 17, 2002

Related U.S. Application Data (62) Division of application No. 09/770,553, filed on Jan. 26, 2001, now Pat. No. 6,452,793.

(51) Int. Cl.[7] ............................ H01R 43/20; G06F 1/16; A47B 81/00; A47B 97/00
(52) U.S. Cl. ............................ 29/876; 29/749; 29/753; 29/861; 361/685; 312/223.2
(58) Field of Search ................. 361/725–727, 361/685, 801, 802, 312, 223.1, 223.2, 686; 312/223.2, 345; 439/928.1; 360/137 D; 292/341.15, 302, 340; 29/749, 753, 861, 876

(56) References Cited

U.S. PATENT DOCUMENTS

| | | | |
|---|---|---|---|
| 4,136,918 A | | 1/1979 | Claesson et al. |
| 4,439,001 A | | 3/1984 | Curley et al. |
| 4,545,635 A | | 10/1985 | Bunnell |
| 4,712,298 A | | 12/1987 | Mondor, III |
| 4,712,846 A | | 12/1987 | Bardsley et al. |
| 4,903,403 A | | 2/1990 | Brown et al. |
| 4,971,571 A | | 11/1990 | Puerner |
| 4,973,827 A | | 11/1990 | Nozaki |
| 4,997,381 A | | 3/1991 | Oh |
| 5,033,188 A | | 7/1991 | Polliard et al. |
| 5,085,591 A | | 2/1992 | Warren, Sr. et al. |
| 5,125,850 A | | 6/1992 | Locati |
| 5,165,167 A | | 11/1992 | Dechelette |
| 5,209,672 A | | 5/1993 | Hatanaka |
| 5,211,459 A | * | 5/1993 | Wu .......................... 312/223.2 |
| 5,231,759 A | | 8/1993 | Olsson |
| 5,325,455 A | * | 6/1994 | Henson et al. ................. 385/89 |
| 5,336,103 A | | 8/1994 | Herboldsheimer |
| 5,343,617 A | | 9/1994 | Tanaka et al. |
| 5,507,650 A | * | 4/1996 | Larabell ........................ 439/61 |
| 5,563,748 A | * | 10/1996 | Hanson ..................... 360/97.01 |
| 5,568,686 A | | 10/1996 | Suarez |
| 5,733,142 A | * | 3/1998 | Clark ........................... 439/567 |
| 6,126,458 A | * | 10/2000 | Gregory et al. ............. 439/76.2 |
| 6,452,793 B1 | | 9/2002 | Boe |

FOREIGN PATENT DOCUMENTS

EP 0122842 A 10/1984

OTHER PUBLICATIONS

U.S. patent application Ser. No. 10/154,963, Boe, filed May 23, 2002.

http://www.connectworld.net/iecnet/Services/ConnGuide-.html; Connector Guide; Jun. 27, 2000.

* cited by examiner

Primary Examiner—Carl J. Arbes
Assistant Examiner—Tai Van Nguyen
(74) Attorney, Agent, or Firm—Perkins Coie LLP (57) ABSTRACT

Methods for preventing disengagement of electrical connectors in computers are disclosed herein. A method in accordance with one embodiment of the invention includes installing an electrical connector into a receptacle on an electrical component in a computer. The method further includes securing a mounting portion of a retaining device to at least one of the manner positions an interface portion of the retaining device at least approximately adjacent to an outwardly facing surface of the connector to prevent the connector from disengaging from the receptacle.

11 Claims, 5 Drawing Sheets

METHODS FOR PREVENTING DISENGAGEMENT OF ELECTRICAL CONNECTORS IN THE ASSEMBLY OF COMPUTERS

CROSS REFERENCE TO RELATED APPLICATION

This application is a divisional of U.S. patent application Ser. No. 09/770,553, now U.S. Pat. No. 6,452,793 filed on Jan. 26 2001.

TECHNICAL FIELD

This invention relates to apparatuses and methods for preventing disengagement of electrical connectors, and more particularly to retainers for preventing disengagement of electrical connectors in the assembly of computers.

BACKGROUND

Computers and many other products have several electrical connectors for operatively coupling internal and external components to one another. In a computer, for example, disk drives and CD-ROMs are coupled to a motherboard using internal connectors, and external output devices (e.g., printers and displays) are coupled to the computer using external connectors. The electronics industry typically uses standardized connectors so that manufacturers can purchase standard connectors from several different outside vendors.

Each computer generally has a plurality of different multiple-pin connectors. Among the more popular multiple-pin connectors available for assembling computers are the D-type, rectangular connectors, and center ribbon cable connectors. Additionally, card-edge connectors having 15–100 pins are also available to connect printed circuit boards to motherboards or other devices. One concern of electrical connectors is maintaining electrical contact between the electrical connectors and the receptacles with which they are engaged. Several types of electrical connectors rely on friction between the connector pins and mating sockets to hold the electrical connectors in the receptacles. Other types of electrical connectors have positive retention devices that securely attach the electrical connectors to the receptacles.

Figure 1A:
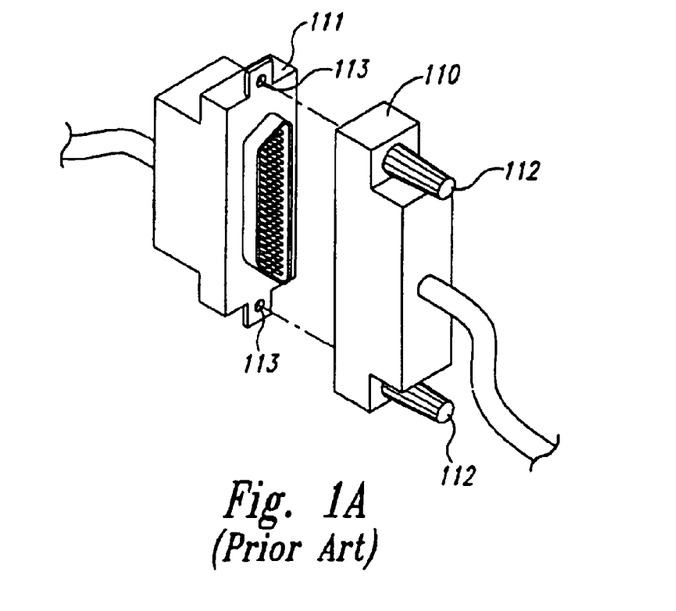
FIGS. 1A and 1B are partial isometric views of two positive retention devices in accordance with the prior art.
Figure 1B:
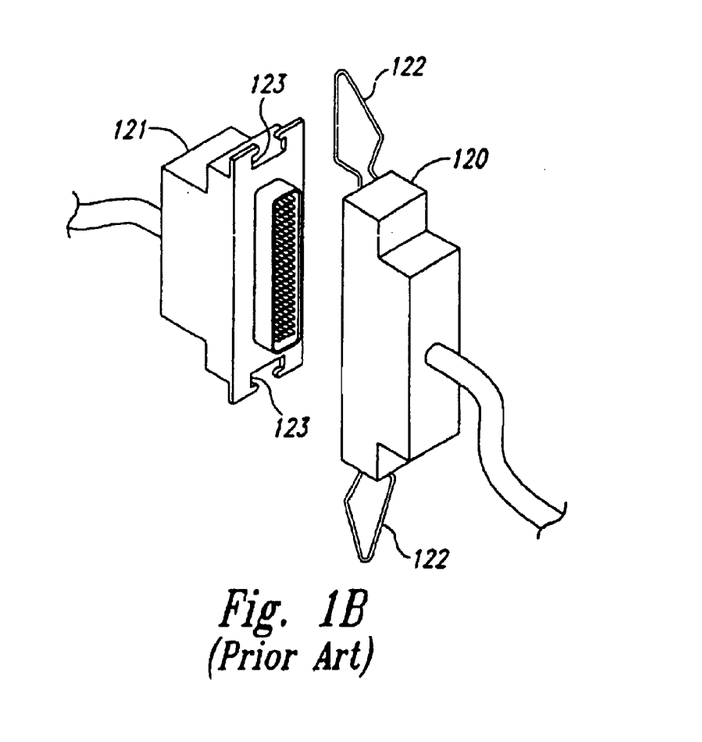

FIGS. 1A and 1B are partial isometric views of two positive retention devices that are commonly used to prevent a connector from disengaging a socket. FIG. 1A, more specifically, shows a D-type connector 110 with two thumbscrews 112 that thread into holes 113 in a receptacle 111. FIG. 1B shows a rectangular type connector 120 with wire-clip latches 122 that snap into slots 123 in a receptacle 121. Not shown in FIG. 1 is a common card-edge type connector used to attach a printed circuit card to a motherboard. This type of connector is commonly provided with lugs that can be soldered to the motherboard to prevent disengagement of the circuit card.

Not all electrical connectors, however, are provided with positive retention devices. For example, electrical connectors for center ribbon cables that are used with drive devices (e.g., floppy disk or CD-ROM drives) typically do not have positive retention devices and rely only on pin friction to maintain engagement with the drive devices. A common problem encountered with this type of connector is that vibrations during transport or handling can cause the connector to disengage from its receptacle. Disengagement can occur during shipment from the point of assembly to the point of sale, or during typical use by the purchaser. This problem is especially acute with portable laptop computers.

Figure 2:
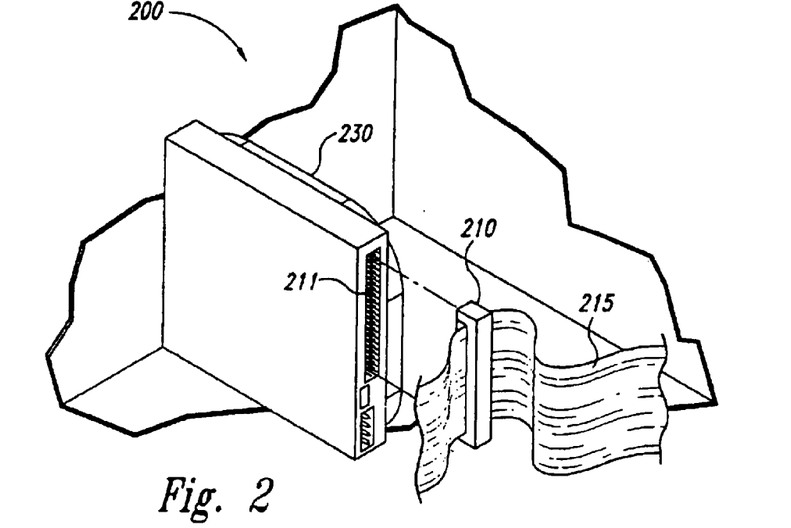
FIG. 2 is a partial isometric view of a standard center ribbon cable connector and receptacle in accordance with the prior art.

FIG. 2 is a partial isometric view of a standard 68-pin IDE (integrated drive electronics) center ribbon cable connector 210 that does not have one of the positive retention devices more commonly used with the D-type or rectangular type connectors shown in FIG. 1. The center ribbon cable connector 210 mates with a 68-pin SCSI (small computer systems interface) connector receptacle 211 to connect an ultra-wide SCSI ribbon cable 215 to a 3½-inch drive device 230. Without a positive retention device, the center ribbon cable connector 210 is prone to vibrate out of the 68-pin SCSI connector receptacle 211 during shipment of a computer 200.

SUMMARY OF THE INVENTION

The present invention is directed toward apparatuses and methods for preventing disengagement of electrical connectors in the assembly of computers. In one embodiment, the apparatus is a computer system having a chassis, an electrical component contained within the chassis, an electrical connector engaged with a receptacle on the electrical component, and a retainer to prevent disengagement of the electrical connector. In this embodiment, the retainer has a mounting portion and a connector interface. The mounting portion can be attached to at least one of the electrical component or the computer chassis. The connector interface is adjacent to the electrical connector to prevent the connector from disengaging from the receptacle on the electrical component. The connector interface can contact the electrical connector to press the connector into the receptacle on the electrical component, or the connector interface can be offset a selected distance to prevent the connector from disengaging from the electrical component. In one aspect of this embodiment, the retainer can prevent a center ribbon cable connector from disengaging a 3½-inch drive device. In other embodiments, the retainer can prevent disengagement of other connectors from other electrical components.

In another embodiment, an apparatus for retaining an electrical connector in a drive device is a retainer having a mounting portion toward a first end and a connector interface toward a second end. The mounting portion can have a substantially flat mounting surface with at least one fastener aperture configured to attach to a housing of the drive device. The connector interface can have a substantially rigid and substantially flat base portion adjacent to the electrical connector when the mounting portion is attached to the drive device. In one aspect of this embodiment, the arrangement of the mounting portion and the connector interface can give the retainer an "L-shape." In other embodiments, the retainer can take other forms. In another aspect of this embodiment, the connector interface can include two side portions that connect to the base portion to form a concave cross-section. This concave cross-section is configured to cup the electrical connector to prevent the disengagement of the connector from the drive device.

In yet another embodiment, an apparatus for retaining an electrical connector in a drive device is a two-piece retainer having a bracket and a movable retainer portion. The bracket can have a first side member, a second side member, and a center member extending between the first and second side members. The side members of the bracket attach to a housing of the drive device. The moveable retainer portion can be operatively coupled to the first and second side members of the bracket. In this embodiment, once the bracket is attached to the housing of the drive device, the electrical connector can be installed in the drive device and the retainer portion can be positioned adjacent to the connector to prevent the connector from disengaging from the drive device.

One method for preventing disengagement of an electrical connector from a drive device in a computer includes securing a mounting portion of a retainer to a housing of the drive device or a chassis of the computer to position a connector interface of the retainer adjacent to the connector. In one aspect of this embodiment, securing the mounting portion of the retainer to the housing of the drive device can include inserting a threaded fastener through a fastener aperture in the mounting portion and threading the fastener into a selected threaded hole in the housing of the drive device. In other embodiments, the mounting portion can be secured to the chassis of the computer and not to the drive device housing.

Another method for preventing disengagement of an electrical connector from a receptacle on an electrical component includes using a two-piece retainer having a bracket and a movable retainer portion. In this embodiment, the retainer bracket is attached to the electrical component, and the electrical connector is installed into the receptacle on the electrical component. The movable retainer portion of the retainer is then positioned adjacent to an outwardly facing surface of the connector to prevent the connector from disengaging from the electrical component. In one aspect of this embodiment, the method can be used to prevent a center ribbon cable connector from disengaging from a 3½-inch drive device. In other embodiments, the method can be used to prevent disengagement of other connectors from other electrical components.

DETAILED DESCRIPTION

The present disclosure describes apparatuses and methods for preventing disengagement of electrical connectors for use in the assembly of computers. Many specific details of certain embodiments of the invention are set forth in the following description and in FIGS. 3 through 6 to provide a thorough understanding of these embodiments. One skilled in the art, however, will understand that the present invention may have additional embodiments, or that the invention may be practiced without several of the details described below. In other instances, well-known structures associated with computers and other electrical component assemblies, such as 3½-inch and 5¼-inch disk drive devices, have not been shown or described in detail to avoid unnecessarily obscuring the description of the embodiments of the invention.

Figure 3:
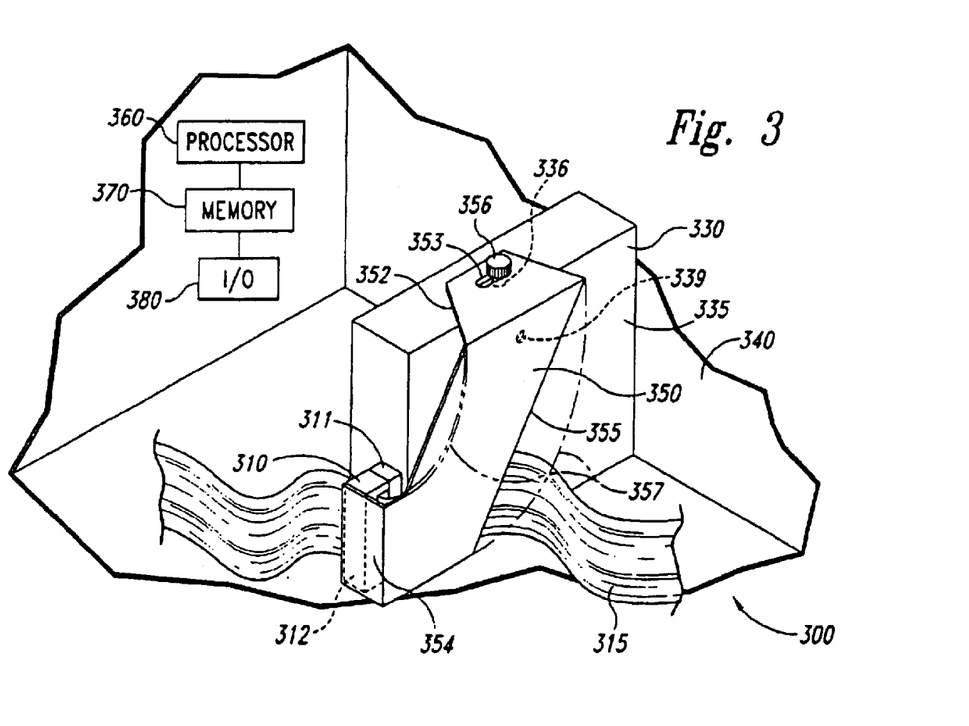
FIG. 3 is a partial schematic isometric view of a computer system having a retainer to prevent disengagement of a connector from a receptacle in accordance with an embodiment of the invention.

FIG. 3 is a partial schematic isometric view of a computer system 300 having a retainer 350 configured to prevent disengagement of a connector 310 from a receptacle 311 in accordance with an embodiment of the invention. The computer system 300 has a chassis 340 housing a processor 360 operatively coupled to a memory device 370 and an input/output device 380. In other embodiments, the computer system 300 can include other electrical components, or any one of the processor 360, memory device 370, or input/output device 380 may be omitted.

The connector 310 engages the receptacle 311 to maintain electrical continuity between a cable 315 and an electrical component 330 contained at least partially within the chassis 340. In one aspect of this embodiment, the cable 315 is a ribbon cable, the connector 310 is a 68-pin IDE center ribbon cable connector, the electrical component 330 is a 3½-inch drive device, and the receptacle 311 is a 68-pin SCSI connector receptacle. In another embodiment, the electrical component 330 can be a 5¼-inch drive device. And in yet other embodiments, the cable 315 can be other cables having other connectors 310, and the electrical component 330 can be other electrical components having other connector receptacles 311.

As best seen in FIG. 3, the retainer 350 has a mounting portion 352 attached to a housing 335 of the electrical component 330, a connector interface 354 adjacent to the connector 310, and an interconnecting-section 355 between the mounting portion 352 and the connector interface 354. The interconnecting-section 355 can carry the connector interface 354. The interconnecting-section 355 of this embodiment is substantially perpendicular to the mounting portion 352 and the connector interface 354. In an alternate embodiment, as shown by phantom lines 357, the interconnecting-section 355 can be shaped and sized to form a curved section that carries the connector interface 354 so that it is adjacent to the connector 310 when the mounting portion 352 is connected to the housing 335 of the electrical component 330. In one aspect of this embodiment, the retainer 350 is made from 20-gauge galvanized steel. In other embodiments, other materials of suitable strength and stiffness may be used.

The mounting portion 352 of the retainer 350 can be securely attached to the housing 335 of the electrical component 330 with a suitable fastener 356. The fastener 356 passes through a fastener aperture 353 in the mounting portion 352 and is secured in a hole 336 in the housing 335. In one aspect of this embodiment, the hole 336 in the housing 335 has a 6-32 UN internal thread and the fastener 356 has a 6-32 UN external thread. In an alternate embodiment, the hole 336 can be configured to accommodate a different type of fastener 356, or the housing 335 can include other holes on other surfaces. For example, the retainer 350 can attach to a threaded fastener hole 339 in a side surface 338 of the housing 335. In one aspect of this alternate embodiment, the mounting portion 352 can be omitted and the fastener 356 can be installed through the midsection 355 to attach the retainer 350 to the housing 335.

In another aspect of the embodiment shown in FIG. 3, the fastener aperture 353 in the mounting portion 352 is an oval shaped slot that allows positional adjustment of the connector interface 354 relative to the connector 310 before the fastener 356 is fully secured in the hole 336. In other embodiments, the fastener aperture 353 can be a round hole, an open-ended slot, or a plurality of holes and/or slots that allows fine positioning of the connector interface 354.

The connector interface 354 of the retainer 350 prevents the connector 310 from disengaging from the receptacle 311 in the electrical component 330. In one aspect of this embodiment, the connector interface 354 directly contacts an outwardly facing surface 312 of the connector 310. In other embodiments, the connector interface 354 can be spaced apart from the surface 312 by a distance of 0.01–0.20 inch, and more preferably, by a distance of 0.065–0.125 inch. In general, the connector interface 354 should be spaced apart from the connector 310 by a distance that is less than the length of the pins of the connector 310. The connector interface 354 can also be spaced apart from the surface 312 by other distances so long as the retainer 350 prevents the connector 310 from disengaging from the receptacle 311.

One advantage of the retainer 350 is that it prevents disengagement of the connector 310 without modifying the electrical component 330, the connector 310, or the receptacle 311. For example, if the electrical component 330 is a conventional 3½-inch drive device with a standard 68 pin SCSI interface connector receptacle 311, this receptacle will typically not include any positive retention devices such as thumbscrews or wire-clip latches. The conventional 3½-inch drive device 330, however, will typically include at least one fastener hole 336 in the housing 335 which is threaded to accommodate a 6-32 UN threaded fastener. The availability of the existing 6-32 UN threaded fastener hole 336 allows retention of the connector 310 with the retainer 350 by positioning the connector interface 354 adjacent to the connector 310 and attaching the mounting portion 352 to the housing 335 as described above.

A further advantage of the retainer 350 is the ease with which the basic configuration can be adapted to accommodate various retention applications. The mounting portion 352, interconnecting-section 355, and connector interface 354 can be configured to take advantage of an existing fastener hole in the proximity of a connector to be retained. The retainer 350 can accordingly be configured for use in a wide range of retention applications. In addition, the low profile of the retainer 350 also helps to minimize potential interference between the retainer 350 and adjacent hardware components contained within the chassis 340 of the computer system 300.

Figure 4:
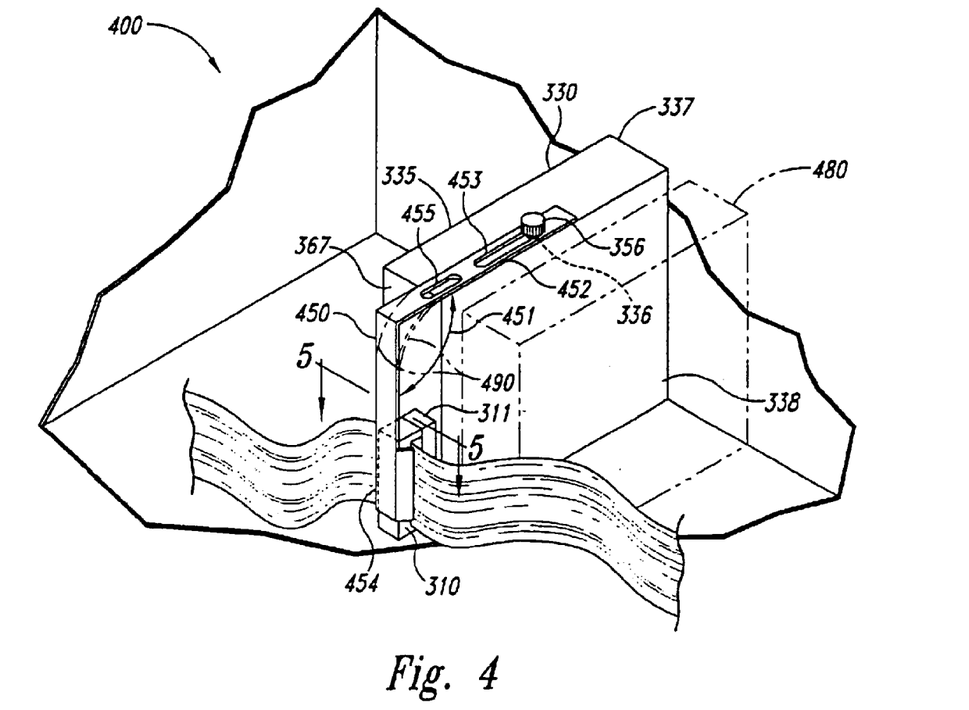
FIG. 4 is a partial schematic isometric view of a computer system having a retainer to prevent disengagement of a connector from a receptacle in accordance with another embodiment of the invention.

FIG. 4 is a partial schematic isometric view of a computer system 400 having a retainer 450 to prevent disengagement of the connector 310 from the receptacle 311 in accordance with another embodiment of the invention. The retainer 450 has a mounting portion 452 that attaches to the housing 335 of the electrical component 330, and a connector interface 454 that is positioned adjacent to the connector 310. The mounting portion 452 and the connector interface 454 have substantially flat surfaces that form an "L-shape." In an alternate embodiment, as shown by phantom lines 490, the retainer 450 can have a curved section between the mounting portion 452 and the connector interface 454.

The mounting portion 452 has a first fastener aperture 453 and a second fastener aperture 455. Either fastener aperture 453 or 455 can be optionally selected to attach the mounting portion 452 to the housing 335 depending on which one most favorably aligns with the hole 336. In one aspect of this embodiment, both of the fastener apertures 453 and 455 are in the shape of elongated cutouts to provide for positional adjustments of the connector interface 454 relative to the connector 310. The first fastener aperture 453 is approximately twice as long as the second fastener aperture 455. In alternate embodiments, the fastener apertures 453 and 455 can be replaced with a plurality of round holes, a single round hole, a single rectangular cutout, or any combination of the foregoing apertures.

As best seen in FIG. 4, the connector interface 454 of the retainer 450 is at an angle 451 relative to the mounting portion 452 so that the connector interface 454 is adjacent to the connector 310 when the mounting portion 352 is attached to the component 330. In one aspect of this embodiment, the angle 451 is approximately 85 degrees so that when the mounting portion 452 is attached to the housing 335 and the angle 451 becomes slightly greater than 85 degrees (e.g., approximately 90 degrees), the connector interface 454 will contact the connector 310 and apply a preload force to the connector 310 to prevent it from disengaging from the receptacle 311. In alternate embodiments, the angle 451 can be approximately 90 degrees or other suitable angles.

One advantage of the computer system 400 having the retainer 450 is that the retainer 450 can be used to prevent disengagement of the connector 310 even when there is no access to the sides of the electrical component 330. For example, an adjacent component 480 may prevent the use of the retainer 350 shown in FIG. 3 because it may preclude access to the side surface 338 of the electrical component 330. The retainer 450 can still be used in this case, however, because it only requires access to a top surface 337 and a back surface 367 of the electrical component 330.

Figure 5:
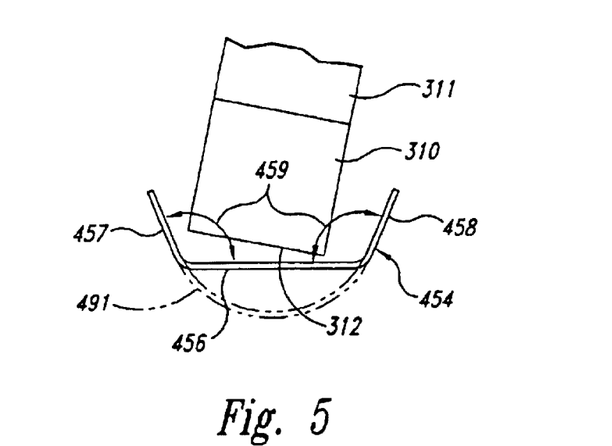
FIG. 5 is a partial cross-sectional view taken substantially along lines 5—5 in FIG. 4 illustrating a connector interface and a connector in accordance with one embodiment of the invention.

FIG. 5 is an enlarged partial cross-sectional view taken from FIG. 4 showing the connector interface 454, the connector 310, and the receptacle 311. The connector interface 454 has a base portion 456, a first side portion 457, and a second side portion 458. The side portions 457 and 458 project away from the base portion 456 at an angle 459. In one aspect of this embodiment, the angle 459 is 105 degrees. In other embodiments, the angle 459 can have other values and can be different for each side portion, or the side portions 457 and/or 458 can be omitted entirely. In an alternate embodiment, the connector interface 454 can be shaped and sized to form a continuous curved portion as shown by phantom line 491. In one aspect of this alternate embodiment, the curved portion can form a circular section. In other aspects, the curved portion can form other curved sections.

One expected advantage of the side portions 457 and 458 is that the retainer 450 should prevent the connector 310 from disengaging from the receptacle 311 even if the connector interface 454 is not aligned with or contacting the connector 310. For example, the first and second side portions 457 and 458 should capture the connector 310 and prevent its disengagement from the receptacle 311 even if the base portion 456 is positioned at an angle to, and offset from, an outwardly facing surface 312 of the connector 310 as shown in FIG. 5.

Figure 6:
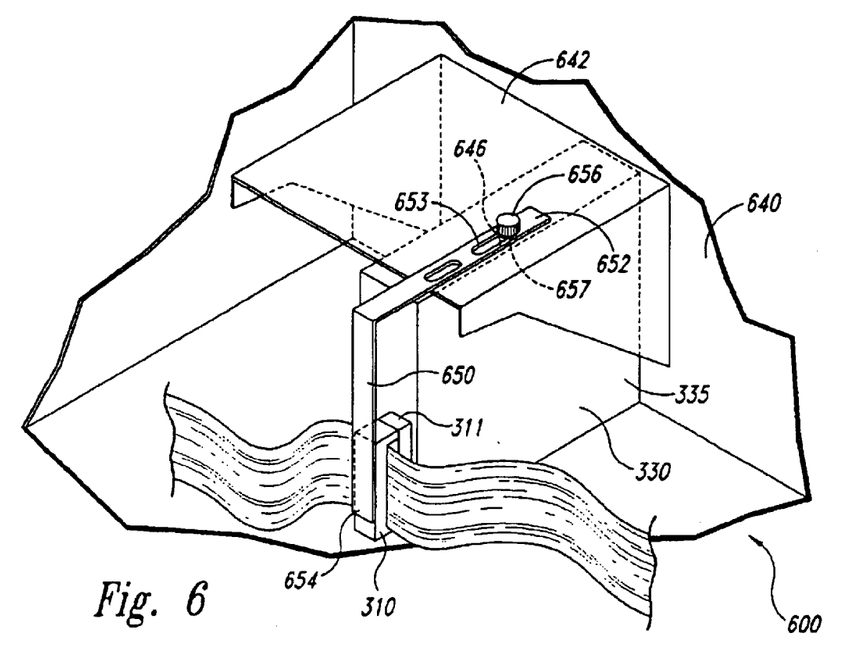
FIG. 6 is a partial schematic isometric view of a computer system having a retainer that attaches to a computer chassis to prevent disengagement of a connector from a receptacle in accordance with yet another embodiment of the invention.

FIG. 6 is a partial schematic isometric view of a computer system 600 having a retainer 650 for preventing disengagement of the connector 310 from the receptacle 311 in accordance with yet another embodiment of the invention. The retainer 650 functions in a substantially similar manner as the retainer 450 shown in FIG. 4, except that a mounting portion 652 is attached to a chassis member 642 instead of the housing 335 of the electrical component 330. The mounting portion 652 is attached to the chassis member 642 with a suitable fastener 656 that passes through a selected aperture 653 in the mounting portion 652 and installs in a hole 646 in the chassis member 642. In one aspect of this embodiment, the hole 646 has a 6-32 UN internal thread and the fastener 656 is a 6-32 UN threaded fastener. In other embodiments, the hole 646 can have other internal threads or it can be a round hole, an elongate oval, or a rectangular slot without any threads. In these non-threaded embodiments, the fastener 656 can be retained in the chassis member 642 with a suitable nut 657 positioned on the far side of the chassis member 642 opposite the mounting portion 652.

A typical computer chassis 640 will often have a plurality of vacant fastener holes and/or other apertures in the proximity of electrical components of the computer. One advantage of the retainer 650 is that the number of possible attachment locations within the computer system 600 is increased by the option of attaching the retainer 650 to either the chassis member 642 or the housing 335 of the electrical component 330. For example, if the housing 335 of the electrical component 330 does not have any vacant fastener apertures, or if access is not afforded to the housing 335, then the retainer 650 may be attached to the chassis 640. Increasing the number of attachment options increases the likelihood that the connector 310 can be retained in any given assembly situation, and that installation of the retainer 650 will not interfere with adjacent components or structure within the chassis 640. In view of the alternate embodiments of the retainers 350, 450, and 650 disclosed and discussed in accordance with FIGS. 3–6, it will be apparent to one of ordinary skill in the art that numerous other one-piece retainer configurations are possible without departing from the spirit and scope of the invention.

Figure 7:
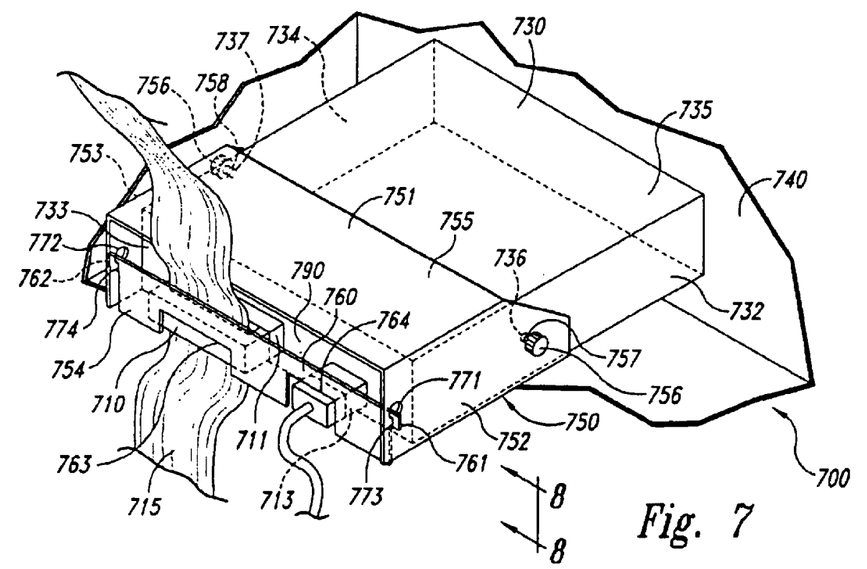
FIG. 7 is a partial schematic isometric view of a computer system having a two-piece retainer to prevent disengagement of a connector from a receptacle in accordance with an embodiment of the invention.

FIG. 7 is a partial schematic isometric view of a computer system 700 having a two-piece retainer 750 for preventing disengagement of a connector 710 from a receptacle 711 in accordance with another embodiment of the invention. The retainer 750 has a bracket 751 and a positionable retainer portion 754. Engagement of the connector 710 to the receptacle 711 provides electrical continuity between a cable 715 and an electrical component 730 contained at least partially within a chassis 740. In one aspect of this embodiment, the cable 715 is a ribbon cable, the connector 710 is a 68-pin IDE center ribbon cable connector, the electrical component 730 is a 3½-inch drive device, and the receptacle 711 is a 68-pin SCSI connector receptacle. In another embodiment, the electrical component 730 can be a 5¼-inch drive device. And in yet other embodiments, the cable 715 can be other cables having other connectors 710, and the electrical component 730 can be other electrical components having other connector receptacles 711.

The electrical component 730 has a housing 735 having a first side section 732 with at least one threaded fastener hole 736 and a second side section 734 with at least one threaded fastener hole 737. A connector receptacle 713 can also be included on an aft section 733 of the electrical component 730 in addition to the connector receptacle 711.

The bracket 751 of the retainer 750 has a first side member 752, a second side member 753, and a center member 755. The first and second side members 752 and 753 can extend away from the center member 755 in approximately the same direction and at approximately right angles to the center member 755. Each side member 752 and 753 has at least one keyhole 771 and 772, respectively, for accommodating the retainer portion 754. Each keyhole 771 and 772 has a keyslot portion 773 and 774, respectively. Each side member 752 and 753 also has at least one fastener aperture 757 and 758, respectively. In one aspect of this embodiment, the fastener apertures 757 and 758 can be elongated oval slots that permit positional adjustment of the bracket 751 in relation to the housing 735. In other embodiments, the fastener apertures 757 and 758 can be round holes, a plurality of round holes, or a plurality of round holes and/or oval or rectangular slots.

The bracket 751 is attached to the housing 735 by inserting a fastener 756 through each of the fastener apertures 757 and 758. In an alternate embodiment, one of the fastener apertures 757 or 758 can be omitted and the bracket portion 751 can be attached to the housing 735 by using a single fastener 756 installed through either one of the fastener apertures 757 or 758.

The retainer portion 754 of the retainer 750 has a substantially flat body 760 with a first tab 761 extending away from the body 760 in a first direction and a second tab 762 coaxially aligned with the first tab 761 and extending away from the body 760 in a second direction opposite to the first direction. The first tab 761 is inserted into the keyhole 771 in the first side member 752 of the bracket 751, and the second tab 762 is inserted into the keyhole 772 in the second side member 753. The retainer portion 754 also has a first cutout 763 configured to receive the cable 715 when the retainer portion 754 is adjacent to the connector 710. The retainer portion 754 can optionally have another cutout 764 configured to receive the connector receptacle 713. In an alternate embodiment, the retainer portion can have other cutouts of different sizes to accommodate different connectors, or the cutouts may be eliminated altogether.

Figure 8:
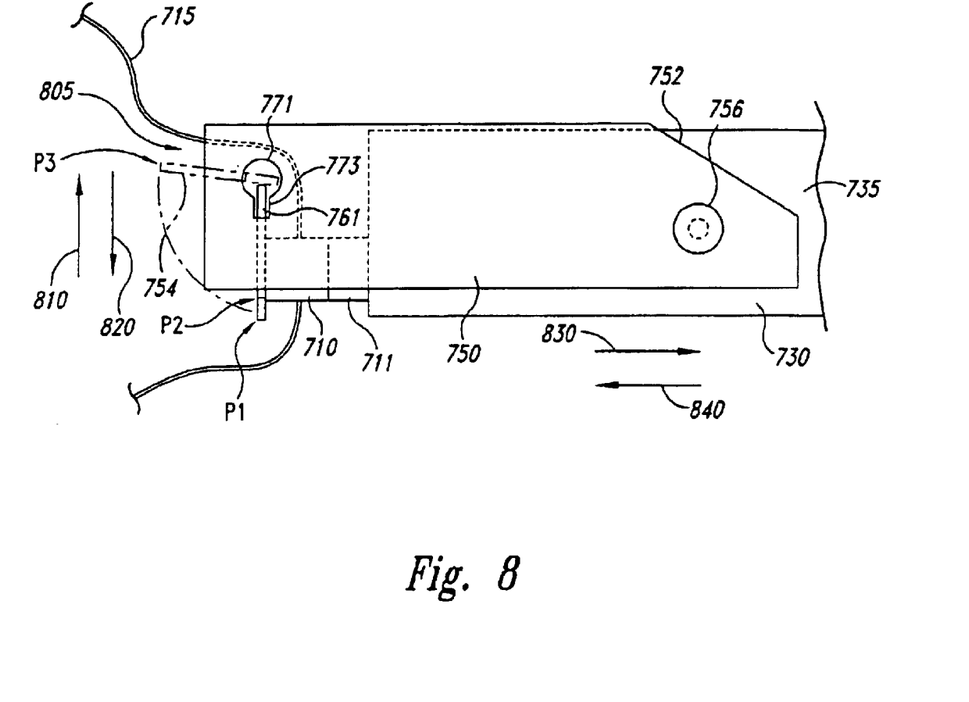
FIG. 8 is a partial side view taken substantially along lines 8—8 in FIG. 7 illustrating the operation of the retainer to prevent disengagement of a connector from a receptacle in accordance with another embodiment of the invention.

FIG. 8 is a side view of the retainer 750 showing the operation of the retainer 750 to prevent disengagement of a connector 710 from a receptacle 711. The bracket 751 is first installed on the housing 735, as explained above in accordance with FIG. 7, except that the fasteners 756 are not fully tightened so that the bracket 751 can be moved relative to the housing 735 (arrows 830 and 840). From position $P_1$, the retainer portion 754 is translated in a first direction 810 (i.e., upward) to position $P_2$ to disengage the tabs 761 and 762 from the key slot portions 773 and 774, respectively. The retainer portion 754 is then rotated outwardly to position $P_3$, and the cable 715 is passed through a gap 805 formed between the bracket portion 751 and the retainer portion 754. The connector 710 is engaged with the receptacle 711 and the retainer portion 754 is rotated downwardly to position $P_2$ and translated in a second direction 820 (i.e., downward) to engage the tabs 761 and 762 with the key slot portions 773 and 774, respectively. Movement of the retainer portion 754 is thus restricted relative to the bracket 751. The bracket portion 751 is then moved in direction 830 to position the retainer portion 754 sufficiently adjacent to the connector 710 to prevent its disengagement, and the fasteners 756 are fully tightened to fixedly attach the retainer 750 to the housing 735 of the electrical component 730.

One advantage of the two-piece retainer 750 is that the connector 710 and cable 715 can be disconnected from the electrical component 730 without requiring that the retainer 750 be removed from the housing 735. Access to the connector 710 is afforded by moving the retainer portion 754 in direction 810 to disengage the tabs 761 and 762 for the key slot portions 773 and 774, respectively, and then rotating the retainer portion 754 to position $P_3$. Quick disconnection of the connector 710 can facilitate and expedite removal and changeout of the electrical component 730 if desired for upgrades or repair.

In an alternate embodiment of the retainer 750 shown in FIG. 7, the retainer 750 can be installed on the housing 735 after the connector 710 has been engaged with the receptacle 711. In one aspect of this embodiment, the retainer portion 754 is stationary with respect to the bracket portion 751. In another aspect of this embodiment, the retainer 750 can be a one-piece bracket with side members 752 and 753 integrally formed with the retainer portion 754, and the center member 755 can be optionally omitted.

From the foregoing, it will be appreciated that even though specific embodiments of the invention have been described herein for purposes of illustration, various modifications can be made to the apparatuses and methods described for connector retention without deviating from the spirit or scope of the invention. Accordingly, the invention is not limited except as by the appended claims.

I claim:

1. A method for retaining an electrical connector in a receptacle on a drive device in a computer, comprising:

installing the electrical connector into the receptacle on the drive device; and securing a mounting portion of a retaining device to at least one of a housing of the drive device or a chassis of the computer to position a connector interface portion of the retaining device at least approximately adjacent to an outwardly facing surface of the connector to prevent the connector from disengaging from the receptacle.

2. The method of claim 1 wherein securing a mounting portion of a retaining device comprises securing the mounting portion to the housing of the drive device by inserting a threaded fastener through a fastener aperture in the mounting portion and threading the fastener into a threaded hole in the housing of the drive device.

3. The method of claim 1 wherein securing a mounting portion of a retaining device comprises securing the mounting portion to the chassis of the computer and not to the drive device.

4. The method of claim 1 wherein the drive device is a 5¼' drive device.

5. The method of claim 1 wherein the mounting portion of the retaining device is secured to at least one of the housing of the drive device or the chassis of the computer so that the connector interface portion of the retaining device is pressing against the outwardly facing surface of the connector to bias the connector toward the receptacle.

6. A method for retaining an electrical connector in a receptacle on an electrical component in a computer, comprising:

installing the electrical connector into the receptacle on the electrical component; and securing a mounting portion of a retaining device to at least one of the electrical component or a chassis of the computer to position a connector interface portion of the retaining device at least approximately adjacent to an outwardly facing surface of the connector to prevent the connector from disengaging from the receptacle.

7. The method of claim 6 wherein the electrical component is a drive device and securing the mounting portion of the retaining device comprises securing the mounting portion to a housing of the drive device.

8. The method of claim 6 wherein the mounting portion of the retaining device is secured to at least one of the electrical component or the chassis of the computer so that the connector interface portion of the retaining device is pressing against the outwardly facing surface of the connector to bias the connector toward the receptacle.

9. A method for retaining an electrical connector in a receptacle on a drive device in the assembly of a computer, comprising:

installing the drive device in a computer chassis;

installing the electrical connector into the receptacle on the drive device; and securing a mounting portion of a retaining device to at least one of a housing of the drive device or a chassis of the computer to position a connector interface of the retaining device at least approximately adjacent to an outwardly facing surface of the connector to prevent the connector from disengaging from the receptacle.

10. The method of claim 9 wherein the mounting portion of the retaining device is a bracket and the connector interface of the retaining device is a movable retainer portion operatively coupled to the bracket, and wherein the method further comprises feeding a ribbon cable attached to the electrical connector through a gap between the bracket and the retainer portion of the retaining device before installing the electrical connector into the receptacle on the drive device.

11. The method of claim 9 wherein the mounting portion of the retaining device is secured to at least one of the housing of the drive device or the chassis of the computer so that the connector interface portion of the retaining device is pressing against the outwardly facing surface of the connector to bias the connector toward the receptacle.

* * * * *